(12) United States Patent
Amram et al.

(10) Patent No.: US 10,511,585 B1
(45) Date of Patent: Dec. 17, 2019

(54) SMOOTHING OF DISCRETIZED VALUES USING A TRANSITION MATRIX

(71) Applicant: EMC IP Holding Company LLC, Hopkinton, MA (US)

(72) Inventors: Shay Amram, Holon (IL); Carmit Sahar, Tel-Aviv (IL); Anatoly Gendelev, Rechovot (IL); Idan Achituve, Ganey Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 209 days.

(21) Appl. No.: 15/498,809

(22) Filed: Apr. 27, 2017

(51) Int. Cl.
| | | |
|---|---|---|
| *H04L 29/06* | (2006.01) | |
| *G06N 7/00* | (2006.01) | |
| *G06F 17/16* | (2006.01) | |

(52) U.S. Cl.
CPC .............. *H04L 63/08* (2013.01); *G06F 17/16* (2013.01); *G06N 7/005* (2013.01); *H04L 63/0884* (2013.01); *H04L 63/0272* (2013.01)

(58) Field of Classification Search
CPC . H04L 63/08; H04L 63/0884; H04L 63/0272; G06F 17/16; G06N 7/005
USPC ........................................................... 726/3
See application file for complete search history.

(56) References Cited

U.S. PATENT DOCUMENTS

| | | | | |
|---|---|---|---|---|
| 6,233,557 | B1 * | 5/2001 | Poppert ................. | G10L 15/148 704/250 |
| 8,352,265 | B1 * | 1/2013 | Lin ....................... | G10L 15/142 704/256.6 |
| 9,305,151 | B1 * | 4/2016 | Dotan .................... | G06F 21/31 |
| 9,558,660 | B1 * | 1/2017 | Fowe .................... | G08G 1/0112 |
| 10,044,745 | B1 * | 8/2018 | Jones ................... | H04L 63/1433 |
| 10,110,634 | B2 * | 10/2018 | Amar .................... | H04L 63/20 |
| 2006/0075273 | A1 * | 4/2006 | Deng ............... | H03M 13/3905 714/1 |
| 2006/0167784 | A1 * | 7/2006 | Hoffberg ............. | G06Q 20/401 705/37 |
| 2007/0168155 | A1 * | 7/2007 | Ravela .................... | G01W 1/10 702/179 |

(Continued)

OTHER PUBLICATIONS

Nong Ye; "Robustness of the Markov-Chain Model for Cyber-Attack Detection;" IEEE Transactions on Reliability, vol. 53, No. 1; Mar. 2004 (Year: 2004).*

*Primary Examiner* — Sarah Su
(74) *Attorney, Agent, or Firm* — Ryan, Mason & Lewis, LLP

(57) ABSTRACT

Techniques are provided for smoothing discretized values used, for example, for authentication or identity assurance. An illustrative method comprises obtaining at least one probability of transitioning between at least two discretized values of a given feature; computing a smoothed feature score for the given feature for a transition from a first one of the discretized values to a second one of the discretized values based on the probability of the transition from the first discrete value to the second discrete value; and performing one or more of authenticating a user and verifying an identity of a user based at least in part on the smoothed feature score. The probabilities of transitioning between the discretized values are optionally stored in a transition matrix. Feature scores for first and second discretized values are optionally weighted based on the probability of the transition from the first discrete value to the second discrete value.

20 Claims, 4 Drawing Sheets

(56) References Cited

U.S. PATENT DOCUMENTS

| | | | | |
|---|---|---|---|---|
| 2009/0183231 A1* | 7/2009 | Jin | | G06F 21/32 |
| | | | | 726/2 |
| 2010/0234041 A1* | 9/2010 | Larsson | | H04W 52/12 |
| | | | | 455/452.2 |
| 2010/0290668 A1* | 11/2010 | Friedman | | G06K 9/00255 |
| | | | | 382/103 |
| 2010/0317420 A1* | 12/2010 | Hoffberg | | G06Q 30/0207 |
| | | | | 463/1 |
| 2011/0131536 A1* | 6/2011 | Peng | | G06F 16/9535 |
| | | | | 715/848 |
| 2012/0023107 A1* | 1/2012 | Nachnani | | G06F 16/24532 |
| | | | | 707/748 |
| 2012/0179061 A1* | 7/2012 | Ramanan | | A61M 16/024 |
| | | | | 600/538 |
| 2013/0174163 A1* | 7/2013 | Maeno | | G06F 11/008 |
| | | | | 718/100 |
| 2013/0197998 A1* | 8/2013 | Buhrmann | | G06Q 30/0255 |
| | | | | 705/14.53 |
| 2014/0012586 A1* | 1/2014 | Rubin | | G10L 25/51 |
| | | | | 704/273 |
| 2014/0196143 A1* | 7/2014 | Fliderman | | G06F 21/32 |
| | | | | 726/19 |
| 2015/0026027 A1* | 1/2015 | Priess | | G06Q 40/00 |
| | | | | 705/35 |
| 2015/0161686 A1* | 6/2015 | Williams | | G06Q 30/0282 |
| | | | | 705/347 |
| 2016/0063150 A1* | 3/2016 | Safonov | | E21B 43/16 |
| | | | | 703/10 |
| 2016/0132722 A1* | 5/2016 | Yarp | | G06F 16/245 |
| | | | | 348/159 |
| 2016/0146960 A1* | 5/2016 | Steckhan | | G01V 1/308 |
| | | | | 702/18 |
| 2016/0285847 A1* | 9/2016 | Oberheide | | G06F 9/00 |
| 2016/0292163 A1* | 10/2016 | He | | G06F 16/9535 |
| 2016/0293167 A1* | 10/2016 | Chen | | G10L 17/18 |
| 2017/0053552 A1* | 2/2017 | Zhong | | A61M 5/142 |
| 2017/0068965 A1* | 3/2017 | Parveen | | G06Q 30/0201 |
| 2017/0083824 A1* | 3/2017 | Miyakoshi | | G06N 7/005 |
| 2017/0094487 A1* | 3/2017 | Phan | | H04W 4/21 |
| 2017/0147582 A1* | 5/2017 | Michels | | G06F 16/24578 |
| 2017/0230417 A1* | 8/2017 | Amar | | H04L 63/20 |
| 2017/0230418 A1* | 8/2017 | Amar | | H04L 67/22 |
| 2017/0270534 A1* | 9/2017 | Zoldi | | G06Q 30/018 |
| 2017/0301347 A1* | 10/2017 | Fuhrman | | G10L 15/20 |
| 2017/0344572 A1* | 11/2017 | Peterson | | G06F 16/93 |
| 2018/0068448 A1* | 3/2018 | Rastgar | | G06K 9/6215 |
| 2018/0173804 A1* | 6/2018 | Kenthapadi | | G06Q 10/1053 |
| 2018/0247178 A1* | 8/2018 | Ide | | G06N 3/00 |
| 2018/0276694 A1* | 9/2018 | Ross | | G06Q 30/0202 |
| 2018/0322242 A1* | 11/2018 | Burke | | G06F 19/10 |
| 2018/0357363 A1* | 12/2018 | Frenkel | | G06F 19/18 |

\* cited by examiner

SMOOTHING OF DISCRETIZED VALUES USING A TRANSITION MATRIX

FIELD

The field relates generally to information processing systems, and more particularly to the generation of scores in information processing systems, for example, using machine learning techniques.

BACKGROUND

Machine Learning (ML) models typically comprise multiple features and data elements upon which learning is applied. A feature can be, for example, a user-age (i.e., the number of days since the user enrolled with the service). An ML model can learn the behavior of a user on multiple days and treat each day separately as a different value, making learning less effective. The behavior of a user whose age is 51 days is typically not distinctive in any significant way from a user whose age is 52 days.

ML algorithms typically employ a discretization procedure that maps ranges of values to a smaller subset of values. For example, ages can be organized into "buckets" (e.g., 0-4 days will be mapped to bucket 0; 5-10 days will be mapped to bucket 5; and 11-31 days will be mapped to bucket 11). Thus, the ML algorithm will have a smaller range of values to deal with and learn upon (0, 5 and 11), thereby making learning more efficient by having more observations per bucket. More observations for fewer discrete values will increase the quality of the learning and the corresponding performance.

Such discretization techniques, however, can lead to a "discretization shock" whenever a user moves from one range (bucket) to another. In other words, when the user-age of a user changes from 4 days to 5 days in the above example, the values will be mapped to different ranges, on which the ML algorithm has calculated a different score. These differences can (and often do) result in a "shock" to the user's score. In adaptive authentication products, for example, this may result in a user suddenly getting a high risk score when it was low for the prior calculation (potentially causing increased false positives). In addition, the user experience is impaired by the additional authentication challenges that may be caused by the higher risk score.

A need exists for techniques for smoothing discretized values as a result of the increased scores (and thereby avoid "discretization shock").

SUMMARY

Illustrative embodiments provide techniques for smoothing discretized values. In one embodiment, a method comprises obtaining at least one probability of transitioning between at least two discretized values of a given feature; computing a smoothed feature score for the given feature for a transition from a first one of the discretized values to a second one of the discretized values based on the probability of the transition from the first discrete value to the second discrete value; and performing one or more of authenticating a user and verifying an identity of a user based at least in part on the smoothed feature score. The probabilities of transitioning between the at least two discretized values are optionally stored in a transition matrix.

In one or more embodiments, the smoothed feature score for the given feature for the transition from the first one of the discretized values to the second one of the discretized values is computed by weighting a feature score for the first one of the discretized values and a feature score for the second one of the discretized values based on the probability of the transition from the first discrete value to the second discrete value.

These and other illustrative embodiments disclosed herein include, without limitation, methods, apparatus, networks, systems and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

The computer networks described herein comprise one or more "information processing systems" that may encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

In one or more embodiments, methods and apparatus are provided for smoothing discretized values. In at least some embodiments, the change between mapped values (i.e., buckets) is smoothed. Among other benefits, one or more embodiments of the disclosed techniques are generic and can be applied to numeric and/or categorical values without any prior knowledge of the features. While one or more embodiments of the disclosure are discussed in the context of an adaptive authentication system, the disclosed techniques can be employed in any environment that employs discretization and has scores, such as identity verification, as would be apparent to a person of ordinary skill in the art.

In at least one embodiment, an anomaly detection approach is employed on the direction of user data, and not on the user data itself. In this manner, common trends in the data (such as increasing user age) can be detected and smoothed, without smoothing the uncommon directions.

Figure 1:
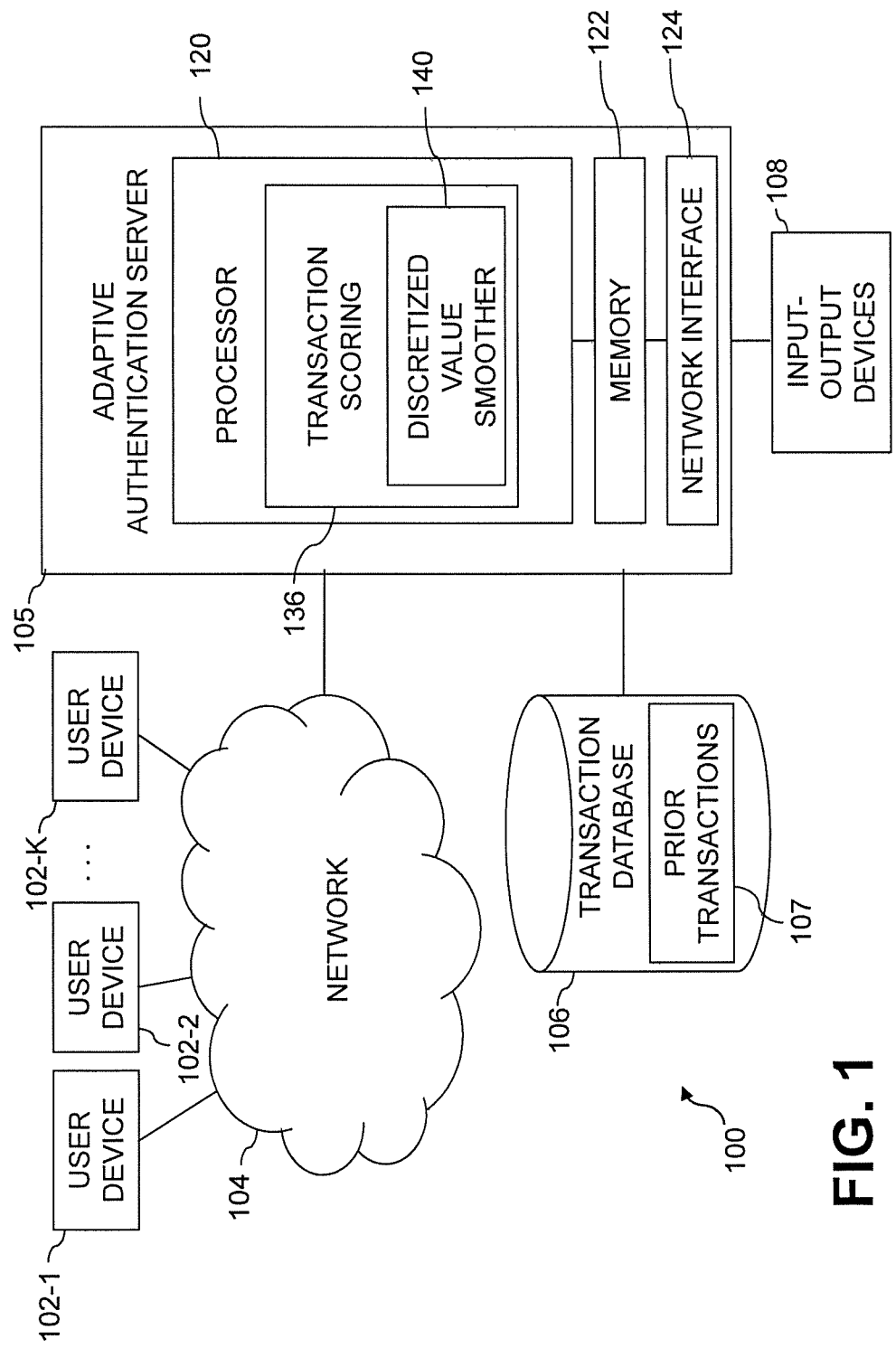
FIG. 1 is a block diagram of a computer network configured for automated smoothing of discretized values in the computation of risk scores in an illustrative embodiment.

FIG. 1 shows a computer network 100 configured in accordance with an illustrative embodiment of the invention. The exemplary computer network 100 is configured in at least one embodiment of the invention to smooth discretized values for generating scores. The computer network 100 comprises a plurality of user devices 102-1, 102-2, . . . 102-K, collectively referred to herein as user devices 102.

The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

Also coupled to the network 104 is an adaptive authentication server 105. The adaptive authentication server 105 is advantageously configured for automated smoothing of discretized values. The adaptive authentication server 105 has an associated transaction database 106 configured to store information relating to prior transactions 107 in the computer network 100. Other types of information that can be stored in the transaction database 106 as part of, or in conjunction with, the prior transactions 107 include network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of information can be incorporated into the prior transactions 107 or otherwise stored in the transaction database 106.

The user devices 102 may comprise, for example, mobile telephones, laptop computers, tablet computers, desktop computers or other types of devices capable of communicating over the network 104, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also associated with the adaptive authentication server 105 are input-output devices 108, which illustratively comprise keyboards, displays or other types of input-output devices in any combination. Such input-output devices are used to support one or more user interfaces to the adaptive authentication server 105, as well as to support communication between the adaptive authentication server 105 and other related systems and devices not explicitly shown.

In one or more embodiments, login events initiated at respective ones of the user devices 102 are directed to the adaptive authentication server 105 over the network 104 for processing. The adaptive authentication server 105 determines if a given access attempt is authentic based on presentation of one or more predetermined authentication factors such as user identifiers, passwords or other factors. Upon verification of the presented authentication factors, the adaptive authentication server 105 grants the requesting user device 102 access to one or more protected resources of the computer network 100. The adaptive authentication server 105 in one or more embodiments can be implemented as a stand-alone server, set of servers or other type of authentication system coupled to the network 104.

The adaptive authentication server 105 in the FIG. 1 embodiment is assumed to be implemented using at least one processing device. Each such processing device generally comprises at least one processor and an associated memory, and implements one or more functional modules for controlling certain features of the adaptive authentication server 105.

More particularly, the adaptive authentication server 105 in this embodiment comprises a processor 120 coupled to a memory 122 and a network interface 124.

The transaction database 106 in the present embodiment is illustratively implemented as part of one or more storage systems coupled to or otherwise associated with the adaptive authentication server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other examples of particular types of storage that can be used in implementing a given storage system in an illustrative embodiment include storage arrays, flash storage, cloud storage, object-based storage, and scale-out NAS clusters. Combinations of multiple ones of these and other storage types can also be used in implementing a given storage system in an illustrative embodiment.

Although shown as being arranged externally to the adaptive authentication server 105, the transaction database 106 in some embodiments can be at least in part internal to the adaptive authentication server 105. For example, at least portions of the transaction database 106 can be implemented as an in-memory database utilizing the memory 122.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the adaptive authentication server 105 to communicate over the network 104 with the user devices 102, and illustratively comprises one or more conventional transceivers.

The processor 120 further comprises a transaction scoring module 136. The transaction scoring module 136 utilizes a discretized value smoother 140, in accordance with one embodiment of the disclosure.

The transaction scoring module 136 utilizes the prior transactions 107 stored in the transaction database 106 and the discretized value smoother 140 to compute risk scores for new transactions. The discretized value smoother 140 utilized in the transaction scoring module 136 can include different functions that are utilized to compute improved risk scores.

The arrangement described above advantageously permits the adaptive authentication server 105 to automatically smooth discretized values and to generate improved risk scores. Accordingly, the limited resources of the adaptive authentication server 105 available for attack detection and remediation can be more intelligently and effectively deployed in the computer network 100, resulting in improved performance as well as enhanced security against attacks.

At least portions of the transaction scoring module 136 may be implemented at least in part in the form of software that is stored in memory 122 and executed by processor 120. Similarly, at least portions of the adaptive authentication server 105 can be implemented at least in part in the form of software that is stored in memory 122 and executed by processor 120.

It should also be understood that the particular set of elements shown in FIG. 1 for automatically smoothing discretized values is presented by way of illustrative example only, and in other embodiments additional or alternative elements may be used. Thus, another embodiment may include additional or alternative systems, devices and other network entities, as well as different arrangements of modules and other components.

By way of example, in other embodiments, one or more components of the adaptive authentication server 105, such as transaction scoring module 136, can be implemented elsewhere in the computer network 100.

In some embodiments, the adaptive authentication server 105 is a part of or otherwise associated with another system, such as, for example, a security operations center (SOC) or a critical incident response center (CIRC).

Additionally or alternatively, the adaptive authentication server 105 can be a part of, or incorporate, an otherwise conventional security analytics system, such as the RSA Security Analytics system commercially available from RSA, The Security Division of Dell/EMC Corporation of Hopkinton, Mass.

Other embodiments can implement the adaptive authentication server 105 as part of or in conjunction with a security information and event management (SIEM) system, such as the enVision® platform, also commercially available from RSA. Such an STEM system is also considered another possible example of a network security system as that term is broadly used herein. In an embodiment of this type, at least portions of the prior transactions 107 stored in the transaction database 106 may comprise additional information derived from security logs collected by the SIEM system.

As noted above, one or more embodiments of the disclosure provide methods and apparatus for smoothing discretized values. In at least some embodiments, the change between mapped values (i.e., buckets) is smoothed. Among other benefits, one or more embodiments of the disclosed techniques are generic and can be applied to numeric and/or categorical values without any prior knowledge of the features. While one or more embodiments of the disclosure are discussed in the context of an adaptive authentication system, the disclosed techniques can be employed in any environment that employs discretization and has scores, as would be apparent to a person of ordinary skill in the art.

In at least one embodiment, an anomaly detection approach is employed on the direction of user data, and not on the user data itself. In this manner, common trends in the data (such as increasing user age) can be detected and smoothed, without smoothing the uncommon directions.

One or more embodiments of the disclosed techniques for smoothing discretized values profile the occurrence of transitions between discretized values (designated herein as Discretized Value Changes) and calculate their probability. Then, the score is weighted for that value according to the probability of the transition between values, as follows:

$$P_{A \to B} = \frac{TRX_{A \to B}}{TRX_A}. \tag{1}$$

Generally, when it is probable for users to move from one bucket to another bucket (as in the constantly increasing user-age, where it is probable to go from age 4 days to 5 days), the score will be smoothed. For example, in the adaptive authentication context, if a user consistently accesses a service using a device with an increasing device-age, it is improbable that the user will log in using a new device having a device-age of 0. Thus, when the user obtains a new device, and accesses the service for the first time using the new device, the assigned risk score should be higher, with a corresponding increased likelihood for one or more additional authentication challenges (e.g., an out-of-band challenge).

The disclosed discretized value smoothing techniques can employ any smoothing scheme, including, without limitation, a weighted average, or an exponential decay, as would be apparent to a person of ordinary skill in the art.

Transition Matrix

One or more exemplary embodiments employ Markov Chains to measure the probability of moving between several discrete values. Generally, Markov Chains are a common method of representing transitions between states.

Figure 2:
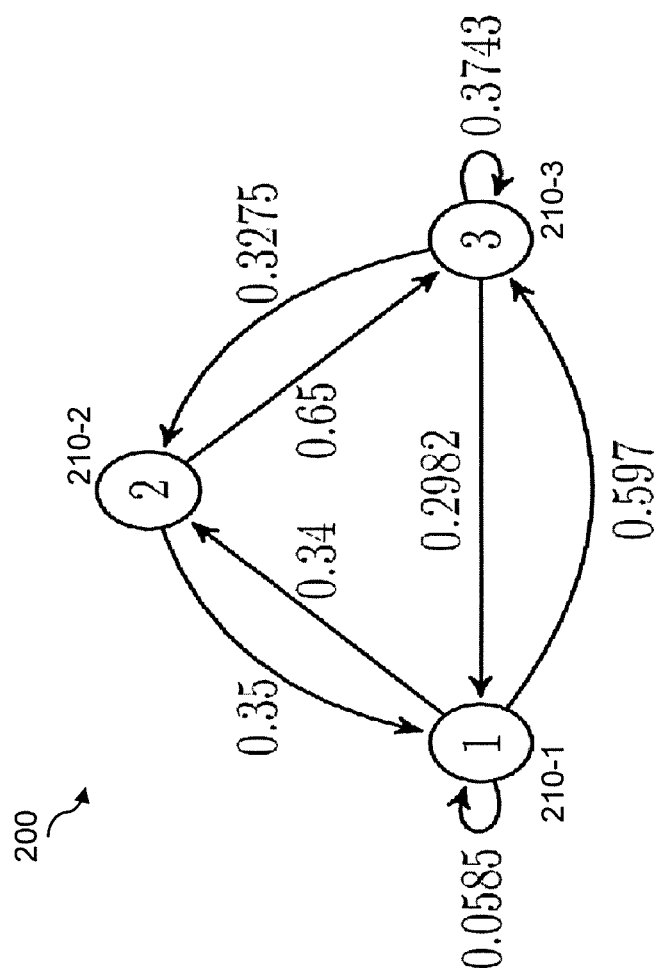
FIG. 2 illustrates an exemplary system, according to one embodiment of the disclosure.

FIG. 2 illustrates an exemplary system 200, according to one embodiment of the disclosure. As shown in FIG. 2, the exemplary system 200 has three (N=3) possible states 210-1 through 210-3 (e.g., buckets). It is possible to formulate the probability for transition between states 210-1, 210-2 and 210-3. In the example of FIG. 2, the transition self→self (such as state 210-1 to state 210-1, with a probability of 0.0585) is also depicted. It is noted that, in one or more embodiments, the transitions between states do not have to be symmetric. For example, going from state 210-1 to state 210-2 might have a different probability than the probability of going from state 210-2 to state 210-1.

Generally, in a given system with N states, it is possible to formulate the probability in which state $s_j$ would occur after a state, $s_i$, where $s_i, s_j \in N$. As noted above, the probability for the change between discrete values A and B (marked as A→B), can be calculated in accordance with equation (1) as follows:

$$P_{A \to B} = \frac{TRX_{A \to B}}{TRX_A},$$

where $TRX_A$ is the number of user transactions that had a mapped value (bucket) of A, and $TRX_{A \to B}$ is the number of transactions for users that previously had a mapped value of A but now have a mapped value (bucket) of B.

Figure 3:
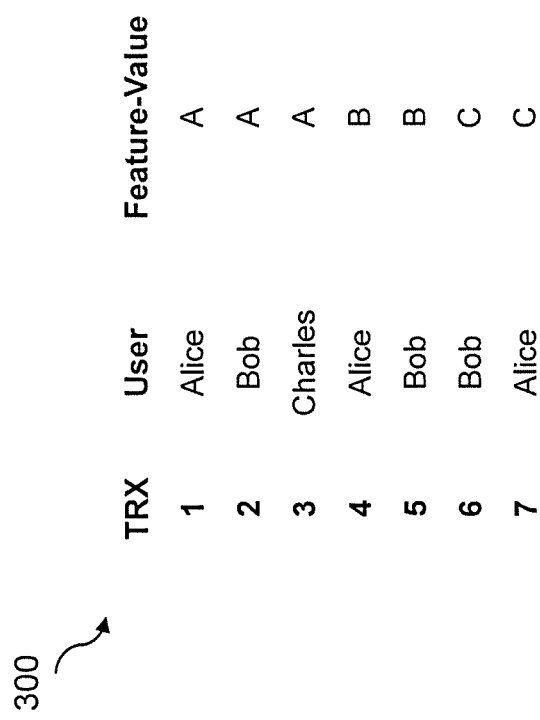
FIG. 3 illustrates an exemplary transaction table, according to one embodiment.

FIG. 3 illustrates an exemplary transaction table 300, according to one embodiment of the disclosure. As shown in FIG. 3, transactions 1 through 3 have a value of A. Thus, the number of user transactions that had a mapped value (e.g., bucket) of A is $TRX_A = 3$.

In transactions 4 through 5, users Alice and Bob have a value of B. These users previously had a value A (in transactions 1 and 2, respectively) so the number of transactions for users that previously had a mapped value of A but now have a mapped value (bucket) of B is $TRX_{A \to B} = 2$.

Using equation (1), the probability for the change between discrete values A and B can be expressed as $$P_{A \to B} = \frac{2}{3}.$$

The transition matrix (TM) for transitions between exemplary states A through Z of a given system can be expressed, as follows:

$$TM = \begin{bmatrix} From\backslash To & A & B & C & \ldots & Z \\ A & — & P_{A \to B} & P_{A \to C} & \ldots & P_{A \to Z} \\ B & P_{B \to A} & — & P_{B \to C} & \ldots & P_{B \to Z} \\ C & P_{C \to A} & P_{C \to B} & — & \ldots & P_{C \to Z} \\ \ldots & \ldots & \ldots & \ldots & \ldots & \ldots \\ Z & P_{Z \to A} & P_{Z \to B} & P_{Z \to C} & \ldots & — \end{bmatrix}$$

In the exemplary transition matrix shown above, the main diagonal is set to "-" since the transition self-self (e.g., transition from state A→A) is normally irrelevant from a score smoothing point of view, and is not calculated.

The exemplary transition matrix shown above also detects "illegal" transitions, such as moving from user-age 5 days to user-age 4 days (a user can't get any 'younger'). In one or more embodiments, such events would have a probability of 0.

Smoothing the Score

In one or more embodiments, the score at a feature level for a given transition from state A to state B can be adjusted using the following probability:

$$Score_{A \to B} = P_{A \to B} \cdot Score_A + (1 - P_{A \to B}) \cdot Score_B \quad (2)$$

In accordance with equation (2), common value changes for transitions from state A to state B would be predominantly influenced by the score of bucket A, while uncommon changes would tend strongly towards the original score of bucket B. Anything in between is smoothed, and creates less "discretization shock" for the user. In this manner, probable transitions are smoothed, while, improbable transitions are not smoothed. Among other benefits, the calculated feature score has a context relative to the previous state for the user.

As previously mentioned, feature scores computed in accordance with equation (2) is only one example of many possible smoothing mechanisms that can be adapted.

Thus, expected (or natural) changes, such as increasing user-age, would be detected as completely normal and the corresponding feature score would be smoothed. In this manner, fewer spikes are created in user scores, false positives are decreased, and the user experience is ultimately improved.

In one or more exemplary implementations, the feature score computed in accordance with equation (2) may be aggregated with feature scores for one or more additional features to obtain an aggregate score, in a known manner.

An exemplary process utilizing transaction scoring module 136 of the adaptive authentication server 105 in computer network 100 will now be described in more detail with reference to the flow diagram of FIG. 4. It is to be understood that this particular process is only an example, and additional or alternative processes can be carried out in other embodiments.

In this embodiment, the process includes steps 410 and 420. These steps are assumed to be performed by the processor 120 utilizing its module 136, but in other embodiments can be performed using other types of computer networks, network security systems and associated processing devices.

Figure 4:
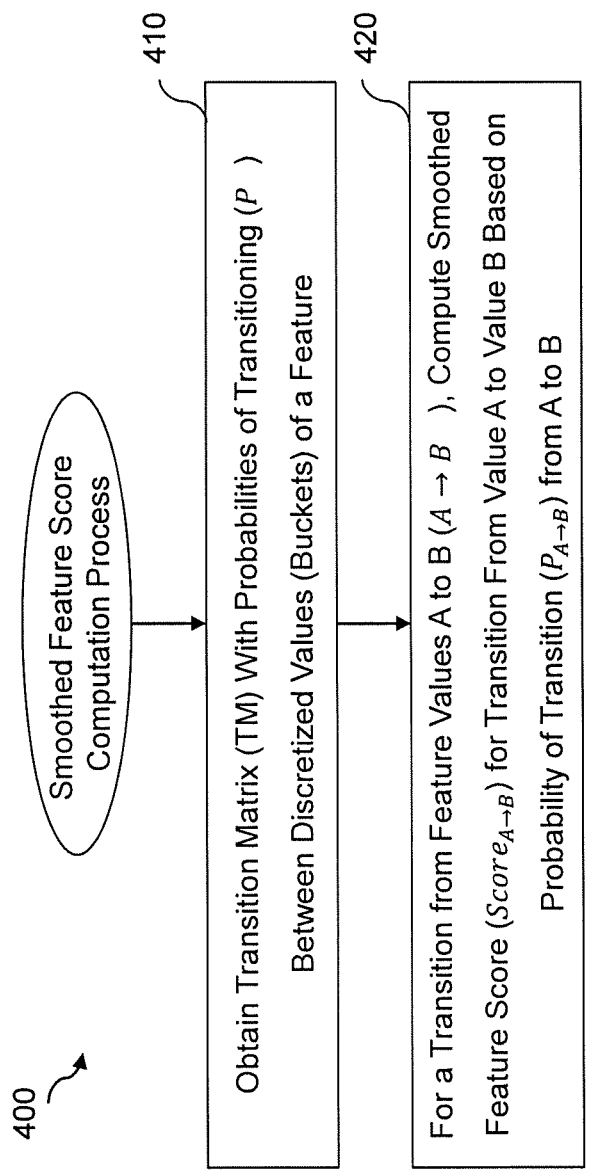
FIG. 4 is a flow diagram of a smoothed feature score computation process in an illustrative embodiment.

FIG. 4 is a flow diagram of a smoothed feature score computation process 400 in an illustrative embodiment. As shown in FIG. 4, the exemplary smoothed feature score computation process 400 initially obtains a transition matrix (TM) during step 410 with probabilities of transitioning (P) between discretized values (e.g., buckets) of a feature. The transition matrix (TM) can be generated, for example, using a number of prior transactions in the transactions database 106.

Then, during step 420, for a transition from feature values A to B (A→B), the exemplary smoothed feature score computation process 400 computes a smoothed feature score ($Score_{A \to B}$) for a transition from value A to value B, based on the probability of a transition ($P_{A \to B}$) from value A to value B.

The smoothed feature score can be used, for example, to calculate an aggregate risk score for a number of features of a particular user or group of users, or a particular user transaction. The aggregate risk score may be used, for example, to authenticate a user and/or to verify an identity of a user.

The FIG. 4 process can be configured for batch processing of multiple transactions or for real-time or near-real-time processing of individual transactions as such transactions are received. Numerous other types of processing modes based on risk scoring can be supported.

The particular processing operations and other network functionality described in conjunction with the flow diagram of FIG. 4 are presented by way of illustrative example only, and should not be construed as limiting the scope of the invention in any way. Alternative embodiments can use other types of processing operations to smooth discretized scores. For example, the ordering of the process steps may be varied in other embodiments, or certain steps may be performed concurrently with one another rather than serially.

Again, the particular arrangements for smoothing of discretized scores described above are exemplary only, and numerous alternative processing arrangements can be used in other embodiments. Accordingly, the various characteristics of these embodiments are intended to be illustrative only and should not be construed as limiting in any way.

The FIG. 4 process in some embodiments is implemented at least in part utilizing map-reduce processing performed by the processor 120 utilizing memory 122 in the adaptive authentication server 105.

In one or more alternate implementations, a threshold parameter $P_{min}$ is optionally assigned, below which the score would be unmodified, so that uncommon value changes remain uncommon and are not smoothed out.

In addition, while the above described exemplary embodiment considers transitions between two events (e.g., previous and current events), one or more embodiments of the invention can be extended to include higher degrees of changes (for example, transitions between states A→B→C), as would be apparent to a person of ordinary skill in the art, based on the present disclosure. The modifications that are required are an expansion of the probability calculation P, using equation (1), and of the modified score calculation, using equation (2).

Among other benefits, the disclosed techniques for smoothing discretized values is generic and can be applied without knowing the context. Increasing ages, for example, would be automatically detected without any specific configuration to do so. On the other hand, uncommon changes (such as a user changing his or her device, or even a user changing his or her geo-location) would also be automatically detected. In the first case of a common change, the score would be smoothed, while in the latter case of an uncommon change, the score would not be smoothed.

In addition, as noted above, the disclosed techniques for smoothing discretized values can be applied to numeric and/or categorical values without any prior knowledge of the features.

Example(s)

In one exemplary implementation, the disclosed techniques for smoothing discretized values can be employed in an adaptive authentication system, such as the Adaptive Authentication (AA) system commercially available from RSA, The Security Division of Dell/EMC of Hopkinton, Mass. The exemplary Adaptive Authentication product is aimed at detecting fraudulent users in a financial institution (such as a bank). A common case in Adaptive Authentication is a user whose credentials have been stolen, and a fraudulent user (e.g., a fraudster) tries to access the user's account and steal (e.g., wire) money.

Consider, for example, the User-Device-Age category in an Adaptive Authentication product. This feature is a combination of user-age and device through which the transaction is going through (e.g., a combination of age of the user and the device age of that user). The User-Device-Age can be expressed, for example, as how long (e.g., in days) that the user is known to the system, and how many days the device is known for that user. This feature produces a Risk Score (RS) where the highest score represents the highest fraud probability. Based on the score, the exemplary Adaptive Authentication product decides whether to provide an authentication challenge to the user or not. A challenge may comprise, for example, asking the user for more information to prove his or her identity, such as secret questions or an out-of-band-identification (e.g., by means of SMS, or email). The fraudster would fail the challenge for not having access to the genuine user's secret information, telephone or email.

The performance of a given category, such as the User-Device-Age category, is measured by analyzing how much fraud is caught in different challenge rates: top 1% of the population, top 2%, and so on. Generally, the Fraud Detection Rate (FDR) will significantly improve when the challenge rate is increased from 1% to 5%.

It has been found that noise is significantly reduced when the disclosed techniques for smoothing discretized values are employed in an Adaptive Authentication system, thus enabling fraud to "surface" above normal users' score much more easily. The increase in FDR is more significant in lower percentages of intervention rate (% challenge). The reason is that better separation between the fraud and non-fraud transactions has a positive impact on the scoring process. In other words, once the risk score for non-fraudulent transactions is no longer high, for example, due to the disclosed smoothing techniques, the significantly riskier transactions scored higher within the above constraints of 1%, 2% and etc. transactions out of the total volume.

It has been found that an exemplary Adaptive Authentication system employing the disclosed techniques for smoothing discretized values improved the FDR for the exemplary User-Device-Age category by 22%, when challenging 3% of the entire population.

The above-described illustrative embodiments provide significant advantages relative to conventional approaches.

The smoothed feature scores generated in accordance with one or more embodiments of the disclosure can be aggregated, for example, into a risk score that is used to authenticate a user and/or verify an identity of a user (often referred to as identity assurance). In an identity assurance implementation, for example, where users tend to be more homogeneous and similar to one another than in the context of adaptive authentication (e.g., where diverse users share a common bank), the smoothed feature scores may be associated with an individual user or a user group, such as a team of enterprise employees. For example, the users of a given team may have similar log-in and communication patterns.

For example, some embodiments are configured to smooth discretized values, and thereby reduce the effects of "discretization shock" when a user or a transaction moves from one range of values (e.g., a bucket) to another. In adaptive authentication products, for example, "discretization shock" may result in a user suddenly getting a high risk score when it was low for the prior calculation (potentially causing increased false positives). In addition, the user experience is impaired by the additional authentication challenges that may be caused by the higher risk score.

With at least one embodiment of the present disclosure, an anomaly detection approach is employed on the direction of user data, and not on the user data itself. In this manner, common trends in the data (such as increasing user age) can be detected and smoothed, without smoothing the uncommon directions. Such feature smoothing provides a substantially improved user experience, without sacrificing risk detection and protection.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, features, risk scores, and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method, comprising:
   obtaining at least one probability of transitioning between at least two discretized values of a given feature, wherein the at least two discretized values are a result of a discretization procedure such that each of the at least two discretized values represents a range of two or more values corresponding to the given feature, wherein each of the at least two discretized values are associated with a respective feature score;
   computing, using at least one processing device, a smoothed feature score for said given feature for a transition from a first one of said discretized values to a second one of said discretized values based at least in part on: (i) the feature score associated with the first discretized value, (ii) the feature score associated with the second discretized value, and (iii) the probability of the transition from the first discretized value to the second discretized value, wherein computing the smoothed feature score smoothes common transitions and does not smooth uncommon transitions; and
   performing, using said at least one processing device, one or more of authenticating a user and verifying an identity of a user based at least in part on said smoothed feature score.

2. The method of claim 1, further comprising the step of detecting when said given feature transitions from said first one of said discretized values to said second one of said discretized values.

3. The method of claim 1, wherein said probabilities of transitioning between said at least two discretized values are stored in a transition matrix.

4. The method of claim 1, wherein said step of computing a smoothed feature score for said given feature is not performed if the probability of the transition from the first discretized value to the second discretized value is below a predefined threshold value.

5. The method of claim 1, further comprising the step of aggregating the smoothed feature score for the given feature with one or more feature scores for one or more additional features to obtain an aggregate score, and wherein said performing is further based on said aggregated score.

6. The method of claim 1, wherein said smoothed feature score for said given feature for said transition from said first one of said discretized values to said second one of said discretized values is computed by weighting the feature score associated with said first one of said discretized values based on said probability of the transition from the first discretized value to the second discretized value and weighting the feature score associated for said second one of said discretized values based on said probability of the transition from the first discretized value to the second discretized value.

7. The method of claim 6, wherein said weighting employs one or more of a weighted average and an exponential decay.

8. The method of claim 1, wherein computing the smoothed feature score is based on a direction of user data corresponding to said given feature.

9. A computer program product, comprising a tangible machine-readable storage medium having encoded therein executable code of one or more software programs, wherein the one or more software programs when executed by at least one processing device perform the following steps:
   obtaining at least one probability of transitioning between at least two discretized values of a given feature, wherein the at least two discretized values are a result of a discretization procedure such that each of the at least two discretized values represents a range of two or more values corresponding to the given feature, wherein each of the at least two discretized values are associated with a respective feature score;
   computing, using at least one processing device, a smoothed feature score for said given feature for a transition from a first one of said discretized values to a second one of said discretized values based at least in part on: (i) the feature score associated with the first discretized value, (ii) the feature score associated with the second discretized value, and (iii) the probability of the transition from the first one of the discretized values to the second one of the discretized values, wherein computing the smoothed feature score smoothes common transitions and does not smooth uncommon transitions; and
   performing, using said at least one processing device, one or more of authenticating a user and verifying an identity of a user based at least in part on said smoothed feature score.

10. The computer program product of claim 9, wherein said probabilities of transitioning between said at least two discretized values are stored in a transition matrix.

11. The computer program product of claim 9, wherein said step of computing a smoothed feature score for said given feature is not performed if the probability of the transition from the first discretized value to the second discretized value is below a predefined threshold value.

12. The computer program product of claim 9, further comprising the step of aggregating the smoothed feature score for the given feature with one or more feature scores for one or more additional features to obtain an aggregate score, and wherein said performing is further based on said aggregated score.

13. The computer program product of claim 9, wherein said smoothed feature score for said given feature for said transition from said first one of said discretized values to said second one of said discretized values is computed by weighting the feature score associated with said first one of said discretized values based on said probability of the transition from the first discretized value to the second discretized value and weighting the feature score associated with said second one of said discretized values based on said probability of the transition from the first discretized value to the second discretized value.

14. The computer program product of claim 13, wherein said weighting employs one or more of a weighted average and an exponential decay.

15. An apparatus, comprising:
   a memory; and
   at least one processing device, coupled to the memory, operative to implement the following steps:
   obtaining at least one probability of transitioning between at least two discretized values of a given feature, wherein the at least two discretized values are a result of a discretization procedure such that each of the at least two discretized values represents a range of two or more values corresponding to the given feature, wherein each of the at least two discretized values are associated with a respective feature score;
   computing, using said at least one processing device, a smoothed feature score for said given feature for a transition from a first one of said discretized values to a second one of said discretized values based at least in part on: (i) the feature score associated with the first discretized value, (ii) the feature score associated with the second discretized value, and (iii) the probability of the transition from the first discretized value to the second discretized value; and
   performing, using said at least one processing device, one or more of authenticating a user and verifying an identity of a user based at least in part on said smoothed feature score.

16. The apparatus of claim 15, wherein said probabilities of transitioning between said at least two discretized values are stored in a transition matrix.

17. The apparatus of claim 15, wherein said step of computing a smoothed feature score for said given feature is not performed if the probability of the transition from the first discretized value to the second discretized value is below a predefined threshold value.

18. The apparatus of claim 15, further comprising the step of aggregating the smoothed feature score for the given feature with one or more feature scores for one or more additional features to obtain an aggregate score.

19. The apparatus of claim 15, wherein said smoothed feature score for said given feature for said transition from said first one of said discretized values to said second one of said discretized values is computed by weighting a feature score for said first one of said discretized values based on said probability of the transition from the first discretized value to the second discretized value and weighting a feature score for said second one of said discretized values based on said probability of the transition from the discretized discrete value to the second discretized value.

20. The apparatus of claim 19, wherein said weighting employs one or more of a weighted average and an exponential decay.

* * * * *

UNITED STATES PATENT AND TRADEMARK OFFICE
CERTIFICATE OF CORRECTION

PATENT NO. : 10,511,585 B1  
APPLICATION NO. : 15/498809  
DATED : December 17, 2019  
INVENTOR(S) : Shay Amram et al.

Page 1 of 1

It is certified that error appears in the above-identified patent and that said Letters Patent is hereby corrected as shown below:

In the Claims

Column 14 Claim 15, Line 31, the portion of the claim reading "second discretized value; and" should read --second discretized value, wherein computing the smoothed feature score smooths common transitions and does not smooth uncommon transitions; and--

Signed and Sealed this  
Ninth Day of June, 2020

Andrei Iancu  
*Director of the United States Patent and Trademark Office*